United States Patent Office
3,344,696
Patented Oct. 3, 1967

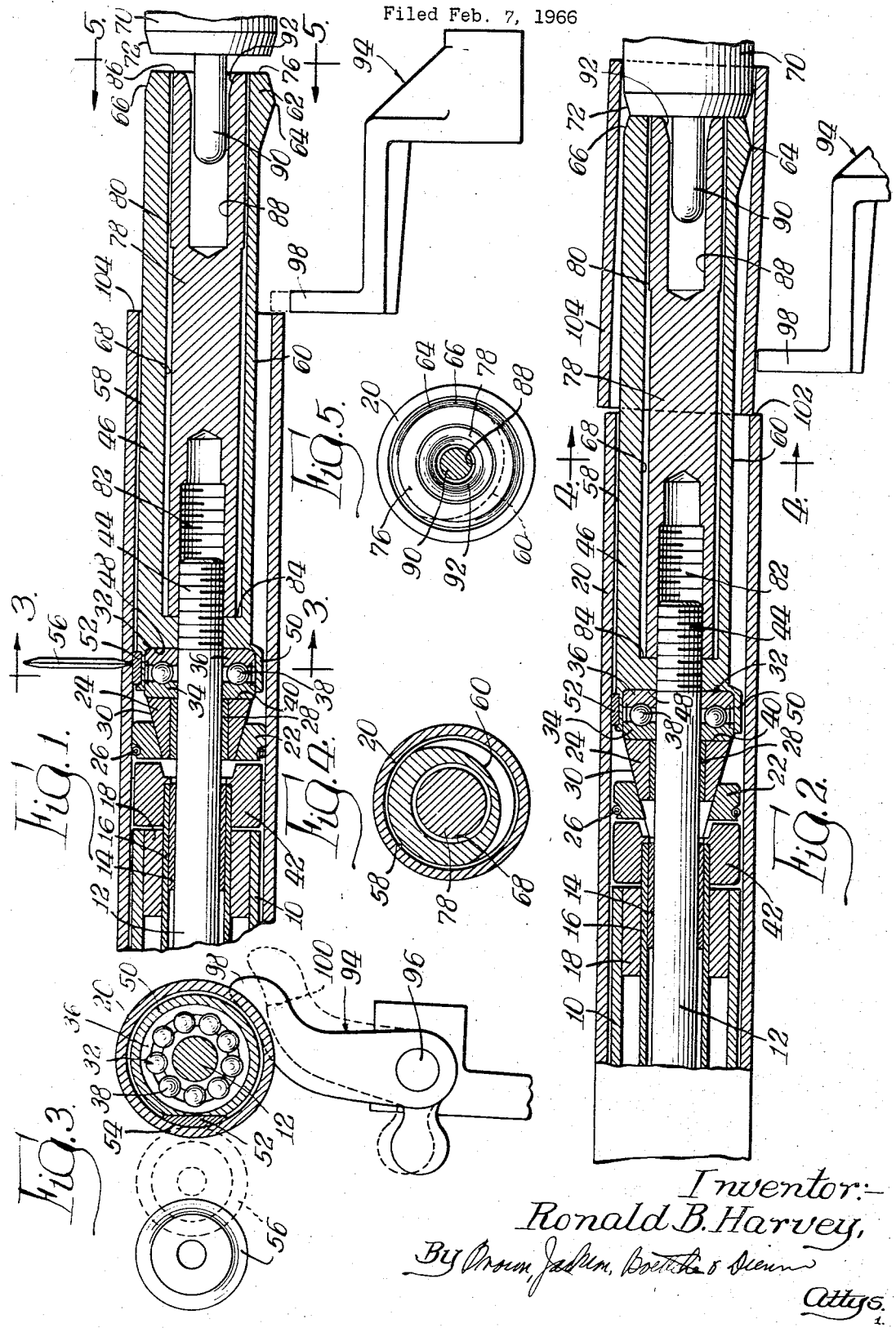

3,344,696
TRANSFER DEVICE
Ronald B. Harvey, Hortonville, Wis., assignor to Appleton Manufacturing Company, Appleton, Wis., a corporation of Wisconsin
Filed Feb. 7, 1966, Ser. No. 525,632
11 Claims. (Cl. 82—101)

This invention relates generally to transfer devices and in particular to a transfer device for transferring segments of stock from a first stock supporting mandrel to a second stock supporting member.

The present invention finds particular utility in combination with machines used to form and cut tubular stock into segments of predetermined length whereupon the tubular segments are transferred to a second machine, as for example, a machine which winds tape or other material upon the tubular segments. It has heretofore been the practice to eject the tubular segments from the cutting machine and manually collect and insert them onto the rewind mandrel of a second machine for a further operation. This manual transfer is inherently time consuming and inefficient, thus leading to higher production costs than possible with the present invention.

It is therefore the primary object of the subject invention to overcome the above disadvantages by providing a transfer device which will receive cut segments of tubing from a first stock supporting mandrel and transfer them onto a second supporting mandrel preparatory to performing a further operation thereon.

It is a feature of the present invention to provide a novel transfer device which may be readily supported by a machine utilizing a mandrel upon which tube stock is supported and cut to predetermined lengths, which transfer device is also associated with a second support mandrel and eliminates the need for manually placing cut tubular segments upon the second mandrel.

Another feature of the present invention is to provide a transfer device which may be used with an automatic tube cutting machine having a target stop to determine the lengths into which tubular segments are cut, which transfer device allows the target stop to be moved into its stop position without interference with a cut tubular segment.

Another feature of the invention is to provide a novel transfer device which includes means to lock the transfer member in supporting relation on a first mandrel, and which locking means includes means to releasably receive a second mandrel in cooperating relation whereby segments of stock may be transferred from the first to the second mandrel.

A further feature of the present invention is to provide a novel transfer device which is economical to manufacture and efficient in operation.

In furtherance of the above object and features, I provide a transfer device comprising a generally tubular shaped body member which may be secured to a first stock supporting mandrel. The end of the tubular body member adjacent the supporting mandrel has a peripheral configuration similar to that of the mandrel such that tubular stock supported by and slidable longitudinally on the first supporting mandrel will be readily received and supported by the transfer device and guided thereon after being cut to predetermined lengths. A locking means is provided within the tubular body member to secure the tubular body to the first mandrel. The locking member is generally cylindrical in shape and has a recess within its outer end to releasably receive a pilot diameter formed integral with or otherwise secured to a second supporting mandrel onto which the cut tubular segments are to be transferred. The end of the tubular body member opposite its support end has a peripheral configuration similar to that of the second supporting mandrel so as to readily guide the cut tubular segments onto the second supporting mandrel. The peripheral surface of the tubular body member includes a recess intermediate its end portions to allow a cut tubular segment to be offset relative to its generally coaxial relation on the transfer member as it is received thereon and also has a backing pad mounted thereon adjacent the first support mandrel such that the backing pad will underlie a cutting knife operable to cut the tubular stock into predetermined lengths or segments.

Further objects, features and advantages of my invention, together with the organization and manner of operation thereof may best be understood by reference to the following description taken in connection with the accompanying drawing, in the several figures of which like reference numerals identify like elements, and in which:

FIGURE 1 is a fragmentary vertical sectional view illustrating the present invention supported adjacent the end of a tubular stock supporting mandrel;

FIGURE 2 is a fragmentary sectional view similar to FIGURE 1 but illustrating a cut segment of tubular stock being transferred onto a second supporting mandrel;

FIGURE 3 is a sectional view taken substantially along the lines 3—3 of FIGURE 1;

FIGURE 4 is a sectional view taken substantially along the lines 4—4 of FIGURE 2; and FIGURE 5 is a view taken substantially along the lines 5—5 of FIGURE 1.

Referring now to the drawing, FIGURE 1 illustrates the present invention mounted adjacent the end of a tubular supporting mandrel 10 which may comprise the stock supporting mandrel of a conventional tube cutting machine or a tube forming machine which includes means to cut the formed tube into predetermined lengths or segments. The tubular mandrel 10 is supported on a non-rotating rod or shaft 12 extending axially through the supporting mandrel and is held in spaced relation thereon by spacer sleeves 14, 16 and 18. The shaft 12 is slidable within sleeve 14 to allow axial movement of the shaft relative to the spacer sleeves and mandrel 10. The peripheral surface of supporting mandrel 10 is generally clindrical and supports a work piece comprising tubular stock 20 in sliding relation such that the tubular stock 20 may be readily moved longitudinally relative to the supporting mandrel 10.

The shaft 12 extends beyond the end of the supporting mandrel 10 and supports a radially expandable clamping jaw assembly comprising jaw segments 22 which are retained radially against an annular wedge member 24 by an encircling band spring 26 in a conventional manner. The annular wedge member 24 is mounted on a sleeve bearing 28, which, in turn, is rotatably supported on the shaft 12, and includes an outer tapered surface 30 which engages a mating tapered surface on the jaw segments 22. A thrust bearing shown generally at 32 is mounted on the shaft 12 and has a pair of annular race members 34 and 36 spaced apart by bearing balls 38. The race ring member 34 is adapted to rotate relative to the fixed shaft 12 and abuts the rear surface 40 of annular wedge member 24. An annular member 42 is fixedly supported on the spacer sleeves 14 and 16 and spaced axially outwardly from the end of the support mandrel 10. The annular member 42 serves to limit movement of the expanding jaws 22 in an axial direction and thereby forces the expanding jaws radially outward to grip the inner peripheral surface of tube 20, as described hereinbelow.

The outer end of shaft 12 is threaded at 44 and threadedly engages and supports thereon a guide mount or transfer member 46. The transfer member 46 is recessed at 48 to receive the thrust bearing 32 and through proper threaded engagement with shaft 12 urges the thrust bearing against the rear surface 40 of annular wedge member 24 to snugly engage the tapered surface 30 against the jaw segments 22. With this arrangement, it may be readily seen that movement of the shaft 12 to a left hand direction when viewing FIGURE 1 will force the jaw segments 22 radially outward against the inward biasing force of spring 26 causing the jaw segments 22 to engage the inner peripheral surface of tube 20 and in a conventional manner.

The end 50 of transfer member 46 has an outer cylindrical peripheral surface substantially the same as that of the supporting mandrel 10 such that it will readily receive the tube 20 thereon in spaced relation. A backing pad 52 (FIGURE 3) having an arcuate outer surface 54 with a radius substantially equal to that of the inner diameter of the tube 20 is mounted on the end of transfer member 46 to underlie a cutting blade 56 which is mounted for movement into and out of tube stock engagement to effect cutting thereof in a conventional manner. The backing pad 52 is preferably made of a hard material such as a carbide compound and is secured to the periphery of end 50 of transfer member 46 in any suitable manner such as by silver soldering.

The guide mount or transfer member 46 is generally tubular in its transverse cross sectional configuration and has an axial length of preferably at least one and one-half times the length of a tubular segment to be cut. It will be understood that the transfer member 46 may have and peripheral configuration which is consistent with the function to be performed by the transfer member. Referring to FIGURE 1 considered with FIGURE 4, the upper peripheral surface 58 of the transfer member 46 preferably has a generally cylindrical configuration similar to that of end 50, extending the length thereof. The peripheral surface of the transfer member 46 is relieved or recessed around a portion of the periphery as at 60 with the maximum depth of the recess allowing a cut segment of tubing to be offset relative to the position in which it is received onto the transfer mandrel 46 and thereafter rests on the peripheral surface 58 (FIGURE 2), as will be explained hereinbelow. The recess 60 preferably extends almost the length of the transfer member 46 but may be made shorter, it being merely necessary that the recess 60 be sufficient to allow a cut segment of tubing to be offset relative to a generally coaxial relation on the transfer member 46.

The outer end 62 of transfer member 46 is provided with a generally cylindrical transverse section at 64 which serves to recenter and guide a cut segment of tubing in substantially coaxial relation on the transfer member prior to its being introduced onto a second support mandrel 70. The end 62 also has a beveled surface 66 which cooperates with a beveled surface 72 on support mandrel 70 to assist in guiding of cut tubular segments onto the support mandrel 70.

The guide mount or transfer member 46 has an axial cylindrical recess 68 which opens into the end surface 76 and receives a locking member 78 therein. The locking member 78 is generally cylindrical in section and has a stepped portion 80 on the outer end thereof which slidably and snugly engages the inner surface of recess 68 in transfer member 46. The locking member 78 is threaded at its forward or innermost end as at 82 to threadedly engage the outer threaded end 44 of fixed shaft 12 and may be tightened onto the threaded shaft 44 against the end surface 84 of recess 68 to lock both transfer mandrel 46 and locking member 78 in relatively fixed axial position on the shaft 12 in a conventional manner. The length of the locking member 78 is equal to the axial depth of the recess 68 such that the outer end 86 of locking member 78 lies in the plane of end surface 76 of transfer member 46. The locking member 78 is provided with a centrally disposed recess or bore 88 which opens into the end face 86 and has a diameter and depth to slidably receive a pilot projection 90 formed on the end of rewind mandrel 70 when the rewind mandrel 70 is brought into cooperating relation with the locking member 78 and transfer member 46. A chamfer 92 is preferably provided on the edge of the intersection of recess 88 with the end face 86 to guide the pilot projection 90 of rewind mandrel 70 into the recess.

Referring now to FIGURE 1 considered with FIGURES 2 and 3, a target stop shown generally at 94 is pivotally mounted about a horizontal axis as at 96 and includes a radially extending arm portion 98. The target stop 94 is adapted to be pivoted into and out of engagement with a cut section of tube 20, as shown in FIGURES 2 and 3, with arm portion 98 having an arcuate portion 100 which engages the outer peripheral surface of a cut segment to thereby urge it upwardly such that the bottom portion of the segment engaging the arm 98 is urged into the recess 60 provided in the transfer member 46. It will be understood that when the target stop 94 is pivoted to a position wherein the arm portion 98 engages a cut tubular segment and urges it upwardly into the recess 60 as shown in FIGURE 2, the arm 98 will be directly in the path of the uncut tube 20 and will serve to abut the outer end 102 of the uncut tubing 20 when it is moved longitudinally forward on the mandrel 10 preparatory to cutting a new segment therefrom. Pivotal movement of the target stop 94 from a lowered position, as shown in dashed lines in FIGURE 3, to an upward tube engaging and stop position, as shown in FIGURE 2, is accomplished in a conventional manner and is correlated with the inward movement of the cutting knife edge 56 and the forward longitudinal intermittent movement of the tube 20 in a conventional manner. A device illustrating the manner in which the aforementioned pivotal movement of target stop 94 may be correlated with the movement of blade 56 and stock member 20 is described in United States Patent 2,521,004 to O. H. Gitter on an application filed Aug. 24, 1948, Ser. No. 45,908.

In operation, a piece of tubular stock 20 which has been placed on the support mandrel 10 or which may be formed by wrapping on the support mandrel 10 or associated apparatus positioned forward of the expanding jaws 22, is caused to be moved forwardly along the support mandrel 10 and onto the transfer member 46 until it abuts the upper arm portion 98 of target stop 94 which has been pivoted to its upward position as shown by dashed lines in FIGURE 1. When the end 102 of the tubular stock 20 engages the target stop 94, the shaft 12 is caused to be moved axially to the left (viewing FIGURE 1) to effect radial expansion of jaws 22 which engage the inner surface of tube section 20 in a conventional manner. The tubular stock 20 is then caused to rotate in a known manner, for example, as disclosed in the above referenced Gitter patent, whereupon the cutting knife 56 is moved inwardly to engage the tube 20 and thereby cut the tube 20 to a segment length determined by the relative position of target stop 94 axially from the knife blade 56. When a tubular segment has been severed from the tube stock, the target stop 94 is caused to pivot downwardly to allow the uncut stock to be moved forward on the mandrel 10. As the uncut tubular stock 20 is moved forward it pushes the cut segment 104 (FIGURE 2) along the transfer member 46 with the outer end of the cut segment being guided over the cylindrical surface portion 64 onto the rewind mandrel 70 which has been moved into engagement with the locking member 78 and transfer member 46 to receive the cut segment 104 of tubular stock. As the cut segment 104 is moved forward over the target stop 94, the target stop is rotated upwardly to engage the outer surface of the cut segment 104 thereby urging it upwardly into the recess 60 and allowing the target stop to position itself to abut a freshly cut end of uncut tubular stock, thereby positioning it for another cutting operation. It will be understood that the rewind mandrel 70 preferably has a diameter or peripheral configuration substantially equal to that of the inner diameter or configuration of a section of cut stock 104 such that as the cut segment is moved forward along the transfer member 46 and onto the rewind mandrel 70, the outer surface of rewind mandrel 70 will frictionally engage the inner surface of the cut segment. When the rewind mandrel 70 is subsequently removed from engagement with the locking member 78 and transfer member 46, the cut segment of tubular stock will be removed completely from the transfer member 46 to thereby allow the rewind mandrel 70 to be moved to another work station whereupon a further operation such as tape winding or wire wrapping may be performed on the cut segment of tubular stock 104.

While I have described my invention for use in conjunction with a tube cutting machine or a tube winding machine having a cutting means adapted thereto, it will be understood that my invention may be used with any device utilizing a mandrel or other tubular stock supporting arrangement and that various changes and modifications may be made without departing from the spirit and scope of the invention. I do not intend to be limited to such forms as above described except insofar as the appended claims are so limited since modification coming within the scope of my invention will be readily suggested to others with my disclosure before them.

I claim:

1. The combination comprising a tube cutting machine having a first tubular stock supporting mandrel and a cutter movable into and out of engagement with stock supported on said first mandrel to effect severing of segments therefrom, and transfer means supported to receive and support cut segments from said first supporting mandrel preparatory to introducing said segments onto a second support mandrel, said transfer means being adapted to guide said cut segments onto said second mandrel.

2. The combination defined in claim 1 including a target stop operative to limit longitudinal movement of tubular stock supported on said first supporting mandrel to thereby determine the lengths of segments cut therefrom.

3. The combination of claim 1 wherein said transfer means includes means to releasably engage said second support mandrel whereby said second mandrel may receive cut segments from said transfer means and be separated therefrom to remove said cut segments from said transfer means.

4. The combination as defined in claim 1 wherein said transfer means includes a backing pad fixedly mounted on the peripheral surface thereof, said backing pad being positioned to underlie said cutter when said cutter is in cutting relation to said stock.

5. The combination defined in claim 1 wherein said transfer means comprises a generally tubular body member adapted to be supported by said first supporting mandrel and to receive cut segments of stock in substantially coaxial sliding relation thereon, said body including a recessed portion intermediate its ends to allow cut segments disposed about said recess to be offset relative to their coaxial relation on the end of said body adjacent said first mandrel, the end of said body opposite said first mandrel being adapted to guide said cut segments onto said second support mandrel and including means to releasably engage said second mandrel in positive relation whereby a cut segment may be transferred from said first to said second supporting mandrels.

6. The combination defined in claim 5 including means to lockably secure said body portion to said first supporting mandrel.

7. For use with first and second stock supporting mandrels, a transfer device adapted to be supported between said first and second supporting mandrels and including means to receive and support cut segments of stock from said first supporting mandrel preparatory to introducing said cut segments onto said second mandrel, said transfer device further including means to guide said cut segments onto said second mandrel.

8. A transfer device as defined in claim 7 including means to releasably engage said second supporting mandrel whereby said second supporting mandrel may receive cut segments from said transfer device and remove said segments therefrom.

9. A transfer device as defined in claim 7 including means to lockably secure said device to said first supporting mandrel.

10. A transfer device as claimed in claim 7 including a backing pad supported on the peripheral surface of said device adjacent said first supporting mandrel, said backing pad being adapted to cooperate with a cutting edge to effect complete severing of segments from stock supported on said first supporting mandrel.

11. A transfer device as defined in claim 7 wherein said means to receive and support cut segments of stock comprises a generally elongated body member adapted to be supported by said first supporting mandrel and including means to receive cut segments from said first supporting mandrel and guide said segments onto said second supporting mandrel, said body member including a recessed portion intermediate its ends to allow cut segments disposed about said recess to be offset relative to their position on said body member as they are received thereon from said first supporting mandrel, said body further including means to releasably engage said second supporting mandrel whereby said cut segments may be introduced onto said second mandrel and removed from said transfer device.

References Cited

UNITED STATES PATENTS

| | | | |
|---|---|---|---|
| 2,521,004 | 9/1950 | Gitter | 82—101 X |
| 3,143,014 | 8/1964 | Blake | 82—101 |
| 3,304,819 | 2/1967 | Pasternack | 82—101 |

HARRISON L. HINSON, *Primary Examiner.*